(12) United States Patent
Xu et al.

(10) Patent No.: US 12,323,036 B2
(45) Date of Patent: Jun. 3, 2025

(54) ROTATING SELF-LOCKING ACTUATOR

(71) Applicant: ZHEJIANG JIECANG LINEAR MOTION TECHNOLOGY CO., LTD., Zhejiang (CN)

(72) Inventors: Xin Xu, Shaoxing (CN); Ligang Chen, Shaoxing (CN)

(73) Assignee: ZHEJIANG JIECANG LINEAR MOTION TECHNOLOGY CO., LTD., Shaoxing (CN)

( * ) Notice: Subject to any disclaimer, the term of this patent is extended or adjusted under 35 U.S.C. 154(b) by 3 days.

(21) Appl. No.: 18/029,781

(22) PCT Filed: Dec. 31, 2021

(86) PCT No.: PCT/CN2021/143590
§ 371 (c)(1),
(2) Date: Mar. 31, 2023

(87) PCT Pub. No.: WO2022/193787
PCT Pub. Date: Sep. 22, 2022

(65) Prior Publication Data
US 2023/0361649 A1      Nov. 9, 2023

(30) Foreign Application Priority Data

Mar. 16, 2021  (CN) .......................... 202120545158.2

(51) Int. Cl.
*H02K 7/10*         (2006.01)
*F16H 25/20*        (2006.01)
(52) U.S. Cl.
CPC ........... *H02K 7/10* (2013.01); *F16H 25/2015* (2013.01)
(58) Field of Classification Search
CPC .. H02K 7/00; H02K 7/08; H02K 7/10; H02K 7/102; H02K 7/11; H02K 7/116;
(Continued)

(56) References Cited

U.S. PATENT DOCUMENTS 6,740,997 B1 * 5/2004 Chen ...................... H02K 7/102
                                                    310/77
2007/0138884 A1 * 6/2007 McMillan ............. E05F 15/603
                                                    310/77
(Continued)

FOREIGN PATENT DOCUMENTS

CN        2770211 Y      4/2006
CN       201580524 U     9/2010
(Continued)

OTHER PUBLICATIONS

Mar. 4, 2022 Search Report issued in International Patent Application No. PCT/CN2021/143590.
(Continued)

*Primary Examiner* — Tran N Nguyen
(74) *Attorney, Agent, or Firm* — Oliff PLC (57) ABSTRACT

A rotating self-locking actuator includes a housing, a self-locking device, and a motor shaft at least one end of which extends out of the housing. The self-locking device includes a pin rod, a friction cap which is disposed outside the housing and sleeved over the motor shaft, and an arc-shaped groove extending helically about an axial direction of the motor shaft and provided on a side wall of the friction cap. The pin rod rotates synchronously with the motor shaft and is sliding-fitted with the arc-shaped groove. The motor shaft causes the pin rod to rotate such that the friction cap is driven by the pin rod to move axially to contact the housing, whereby friction self-locking is enabled, and the friction cap is driven by the pin to move axially to detach from the housing, whereby the friction self-locking is released.

16 Claims, 11 Drawing Sheets

(58) Field of Classification Search
CPC ........ H02K 7/1166; H02K 7/12; F16D 59/00;
F16D 23/00; F16D 23/12; F16D 13/00;
F16D 13/22; F16D 65/00; F16D 65/06;
F16D 65/18; F16H 25/00; F16H 25/20;
F16H 25/22; F16H 25/22; F16H 25/2204
See application file for complete search history.

(56) References Cited

U.S. PATENT DOCUMENTS

2009/0152057 A1\* 6/2009 Yamamoto ............ E05F 11/505
74/425
2017/0058852 A1 3/2017 Takagi et al.

FOREIGN PATENT DOCUMENTS

| CN | 110388430 A | 10/2019 |
| CN | 112370308 A | 2/2021 |
| CN | 212627492 U | 2/2021 |
| CN | 214674741 U | 11/2021 |
| EP | 3329580 B1 | 7/2020 |

OTHER PUBLICATIONS

Mar. 27, 2024 Extended Search Report issued in European Patent Application No. 21931358.2.
Mar. 4, 2022 Written Opinion issued in International Patent Application No. PCT/CN2021/143590.

\* cited by examiner

ROTATING SELF-LOCKING ACTUATOR

FIELD

Embodiments of the disclosure relate to actuators and more particularly relate to a rotating self-locking actuator.

BACKGROUND

When a conventional actuator applied in electrical furniture is deactivated, its motor shaft would still rotate to a certain extent under the action of load, causing continued descending of a furniture part, such that the furniture part cannot stop at a predetermined height position, which deteriorates user experience.

SUMMARY

To overcome the above and other drawbacks in the prior art, the disclosure provides a rotating self-locking actuator, which enables braking of the motor shaft upon deactivation of the actuator and may prevent descending of a furniture part when being applied to electrical furniture.

Embodiments of the present disclosure provide a technical solution below:

a rotating self-locking actuator, comprising: a housing, a self-locking device, and a motor shaft at least one end of which extends out of the housing; the self-locking device comprises a pin rod, and a friction cap which is disposed outside the housing and sleeved over the motor shaft; an arc-shaped groove extending helically about an axial direction of the motor shaft is provided on a side wall of the friction cap; the pin rod rotates synchronously with the motor shaft and is sliding-fitted with the arc-shaped groove; the motor shaft brings the pin rod to rotate such that the friction cap is driven by the pin rod to move axially; the friction cap moves axially to contact the housing, whereby friction self-locking or detachment is enabled.

In some embodiments, a through-hole running radially is provided on the motor shaft, the pin rod being insertion-fitted with the through-hole.

In some embodiments, a bushing is sleeved over the motor shaft, the bushing rotating synchronously with the motor shaft, the pin rod being fixed on the bushing.

In some embodiments, a mounting hole communicating with the arc-shaped groove is provided on the friction cap, the pin rod being inserted in the arc-shaped groove via the mounting hole.

In some embodiments, the friction cap comprises a cap body where the arc-shaped groove is provided, and support blocks circumferentially provided at intervals at an outer peripheral side of the cap body, the support blocks each having a friction surface for contact with the housing.

In some embodiments, the support blocks are U-shaped elastic blocks, bottom edges of the U-shaped elastic blocks contacting the housing to enable friction self-locking.

In some embodiments, the arc-shaped groove has a central angle α ranging from 30° to 150°.

In some embodiments, an axial distance H between two ends of the arc-shaped groove along the axial direction of the motor shaft is greater than 0 mm and less than 0.5 mm.

In some embodiments, two arc-shaped grooves are symmetrically distributed on the side wall of the friction cap.

In some embodiments, the actuator comprises an electric motor, the housing refers to a motor housing, at least one end of the motor shaft extends out of the motor housing, and the friction cap moves axially to contact the motor housing, whereby friction self-locking or detachment is enabled; or, the actuator comprises an electric motor and a gearbox, the housing comprises a motor housing and a gearbox housing, at least one end of the motor shaft extends out of the motor housing, and the friction cap moves axially to contact the gearbox housing, whereby friction self-locking or detachment is enabled.

The disclosure offers the following benefits:

In the disclosure, rotating of the motor shaft drives the pin rod to rotate synchronously. Since the pin rod is sliding-fitted with the arc-shaped groove on the friction cap, the pin rod may slide from one end of the arc-shaped groove to the other end thereof, A certain distance existent between the two ends of the arc-shaped groove in the axial direction of the motor shaft allows for the pin rod to drive the friction cap to move along the axial direction of the motor shaft. When the friction cap is driven to move axially to contact the housing to generate friction, the friction force between the friction cap and the housing prevents continued rotation of the motor shaft, whereby self-locking is enabled. When the friction cap is driven to move axially till being detached from the housing, self-locking of the motor shaft is relieved. In the case that the rotating self-locking actuator is applied to electrical furniture, during descending of a furniture part, the friction cap is driven by the pin rod to move axially till contacting the housing, which achieves continuous friction self-locking; at this point, the torque applied on the motor shaft is greater than the self-locking force, which ensures descending of the furniture part; when the actuator is deactivated, the self-locking force enables braking of the motor shaft to prevent further descending of the furniture part, whereby the furniture part may stop at a predetermined height position, enhancing user experience.

A through-hole running radially is provided on the motor shaft, the pin rod being insertion-fitted with the through-hole. This design facilitates mounting of the pin rod.

A bushing is sleeved over the motor shaft, the bushing rotating synchronously with the motor shaft, the pin rod being fixed on the bushing. This design eliminates creation of holes on the motor shaft, whereby the strength of the motor shaft is ensured; in addition, by varying the mounting position of the bushing on the motor shaft, impacts from machining errors may be mitigated.

A mounting hole communicating with the arc-shaped groove is provided on the friction cap, the pin rod being inserted in the arc-shaped groove via the mounting hole. This design facilitates assembly of the technical solution of securing the pin rod to the bushing, i.e., upon assembly, the bushing is first fixed on the motor shaft, and then the friction cap is sleeved over the motor shaft, followed by inserting the pin rod into the arc-shaped groove via the mounting hole. With this design, by turning the friction cap, the friction cap and the housing are kept in a detached state.

The friction cap comprises a cap body where the arc-shaped groove is provided, and support blocks circumferentially provided at intervals at an outer peripheral side of the cap body, the support blocks each having a friction surface for contact with the housing. This design may effectively increase the arm of friction force which further reduces the contact area between the friction cap and the housing, whereby wear to the housing is reduced.

The support blocks are U-shaped elastic blocks, bottom edges of the U-shaped elastic blocks contacting the housing to enable friction self-locking. This design allows for elastic contact between the bottom edges of the support blocks and the housing. Compared with rigid contact, wear to the housing is reduced; besides, under the action of elastic restoring force, the bottom edges of the support blocks, even worn to a certain extent, may be deformed outward to realize contact friction with the housing, whereby service life of the friction cap is extended.

The arc-shaped groove has a central angle α ranging from 30° to 150°. This design not only facilitates machining of individual arc-shaped grooves but also facilitates subsequent arrangement of a plurality of arc-shaped grooves.

An axial distance H between two ends of the arc-shaped groove along the axial direction of the motor shaft is greater than 0 mm and less than 0.5 mm. This design facilitates smooth reciprocal sliding of the pin rod in the arc-shaped groove, thereby avoiding dead lock of the pin rod in cases of an overly large axial distance H.

Two arc-shaped grooves are symmetrically distributed on the side wall of the friction cap. This design facilitates steady axial movement of the friction cap and avoids occurrence of dead lock when the friction cap tips during axial movement.

The above and other features and advantages of the disclosure will be described in detail through specific implementations with reference to the accompanying drawings.

BRIEF DESCRIPTION OF THE DRAWINGS

The disclosure will be further described with reference to the accompanying drawings, in which.

DETAILED DESCRIPTION

The disclosure provides a rotating self-locking actuator, comprising: a housing, a self-locking device, and a motor shaft at least one end of which extends out of the housing; the rotating self-locking device comprises a pin rod, a friction cap disposed outside the housing and sleeved over the motor shaft; an arc-shaped groove extending helically about an axial direction of the motor shaft is provided on a sidewall of the friction cap; the pin rod rotates synchronously with the motor shaft and is in sliding-fit with the arc-shaped groove; the motor shaft brings the pin rod to rotate such that the friction cap is driven by the pin rod to move axially; the friction cap moves axially to contact the housing, whereby friction self-lock or detachment is enabled.

In the disclosure, the motor shaft rotating drives the pin rod to rotate synchronously; since the pin rod is in sliding-fit with the arc-shaped groove on the friction cap, the pin rod may slide from one end of the arc-shaped groove to the other end thereof. A certain distance existent between two ends of the arc-shaped groove in the axial direction of the motor shaft allows for the pin rod to drive the friction cap to move along the axial direction of the motor shaft. When the friction cap is driven to move axially to contact the housing to generate friction, the friction force between the friction cap and the housing prevents continued rotation of the motor shaft to enable self-locking. When the friction cap moves axially till being detached from the housing, self-locking of the motor shaft is relieved. In the case that the rotating self-locking actuator is applied to electrical furniture, the friction cap is driven by the pin rod to move axially till contacting the housing during descending of a furniture part, which achieves continuous friction self-locking; at this point, the torque applied on the motor shaft is greater than the self-locking force, which ensures descending of the furniture part; when the actuator is deactivated, the self-locking force enables braking of the motor shaft to prevent further descending of the furniture part, whereby the furniture part may stop at a predetermined height position, enhancing user experience.

Hereinafter, the technical solution of the disclosure will be explained and described with reference to the accompanying drawings; however, it is noted that the embodiments described below are only preferred embodiments of the disclosure, not all of them. Other embodiments derived by those skilled in the art without exercise of inventive work all fall within the protection scope of the disclosure.

First Embodiment

As illustrated in FIGS. 1 to 7, a rotating self-locking actuator in this embodiment comprises a housing 100, a self-locking device, and a motor shaft 200 at least one end of which extends out of the housing 100. The actuator comprises an electric motor, and the housing 100 refers to a motor housing. The motor housing comprises a front end cover 110 and a front bearing 600 disposed on the front end cover. The motor shaft 200 has a front end and a rear end, the front end of the motor shaft 200 running through the front end cover 110 and the front bearing 600 to be exposed outside the housing 100. The self-locking device comprises a pin rod 300 and a friction cap 400. The pin rod 300 rotates synchronously with the motor shaft 200 and is disposed on the front end of the motor shaft 200. The friction cap 400 is sleeved over the front end of the motor shaft 200. An arc-shaped groove 410 extending helically about an axial direction of the motor shaft 200 is provided on a sidewall of the friction cap 400. The pin rod 300 is in sliding-fit with the arc-shaped groove 410, The motor shaft 200 brings the pin rod 300 to rotate such that the pin rod 300 drives the friction cap 400 to move axially. The friction cap 400 moves axially to contact the front bearing 600, enabling friction self-locking or being detached from the front bearing 600, relieving self-locking.

Figure 1:
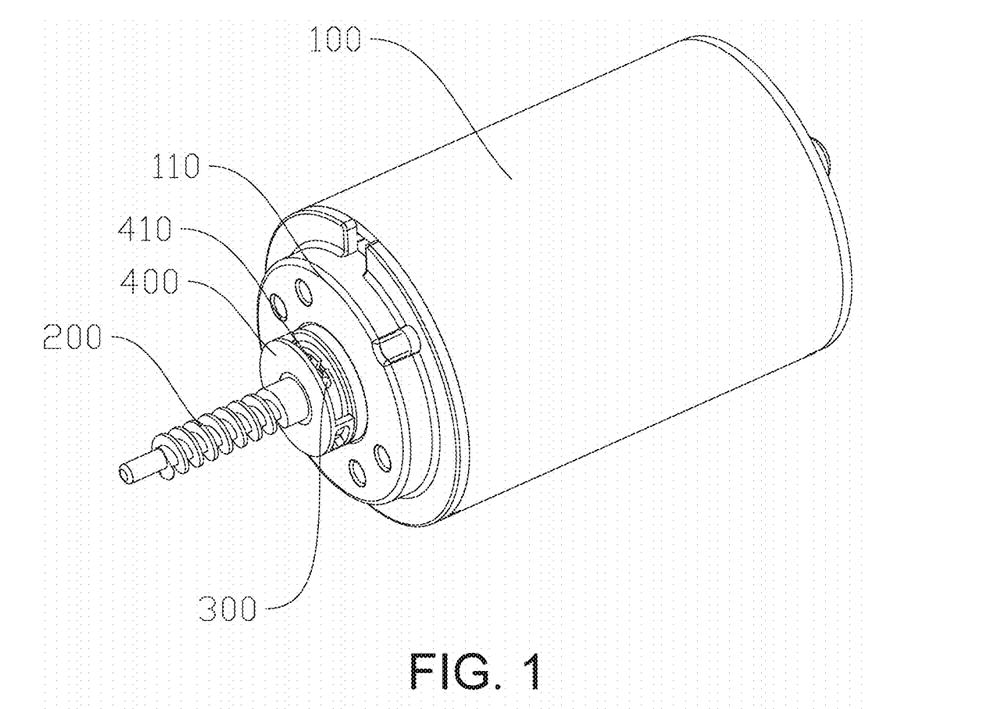
FIG. 1 is a structural diagram of an actuator according to a first embodiment of the disclosure.
Figure 2:
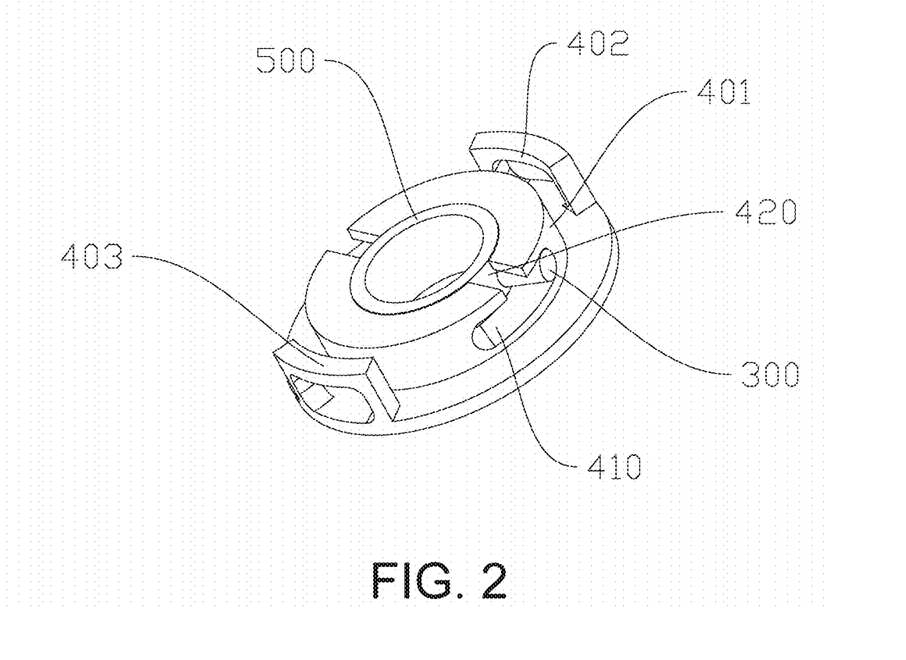
FIG. 2 is a structural diagram of fitting between a friction cap, a bushing, and a pin rod according to the first embodiment of the disclosure.
Figure 3:
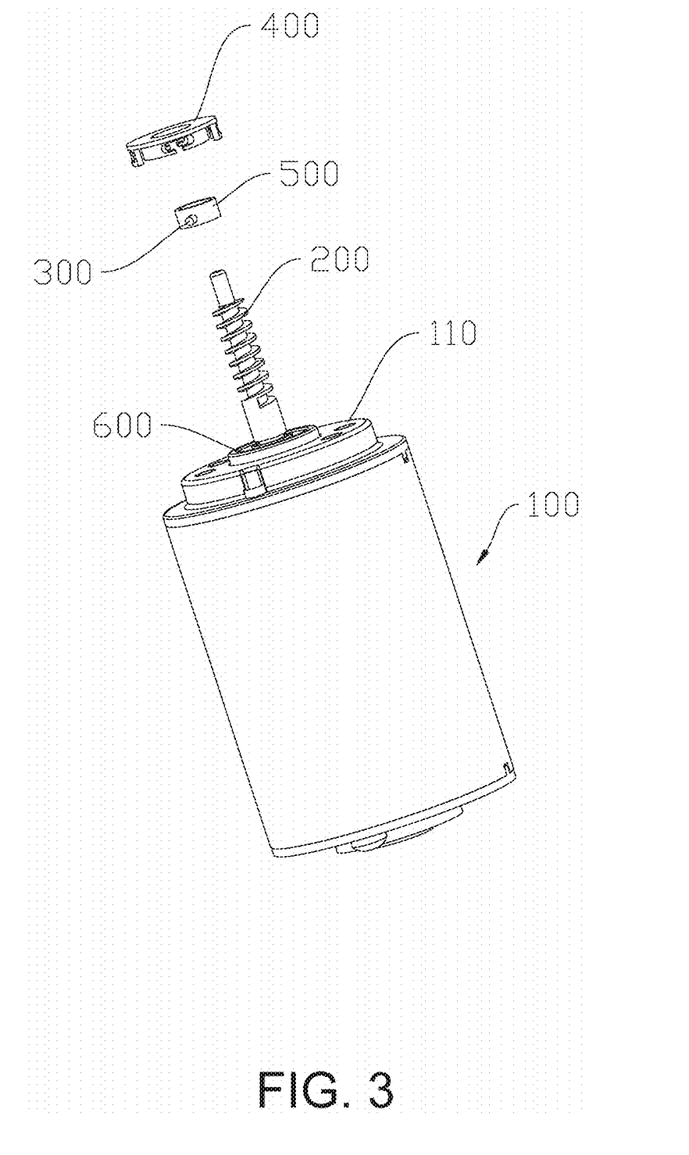
FIG. 3 is a local exploded view of the actuator according to the first embodiment of the disclosure.
Figure 4:
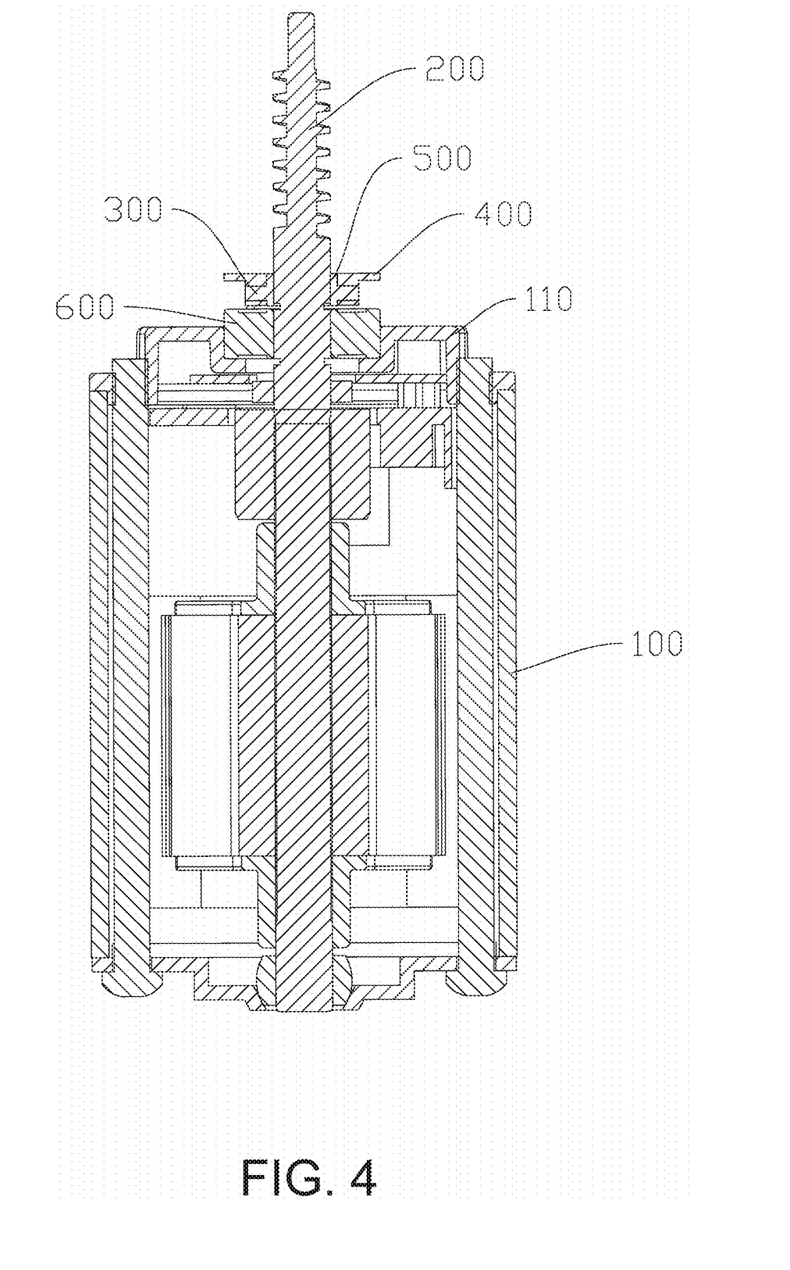
FIG. 4 is a sectional view of the actuator according to the first embodiment of the disclosure.
Figure 5:
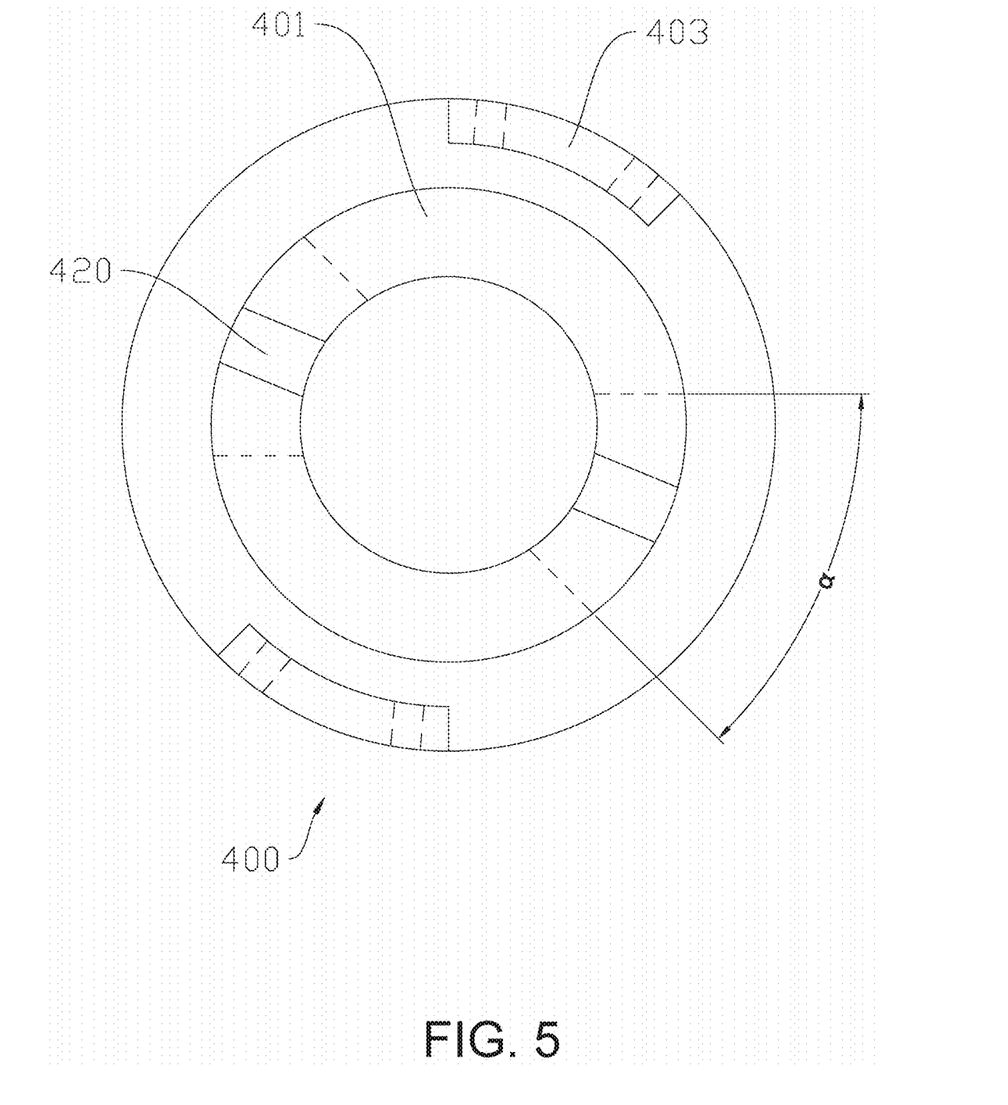
FIG. 5 is a front view of the friction cap according to a first embodiment of the disclosure.
Figure 6:
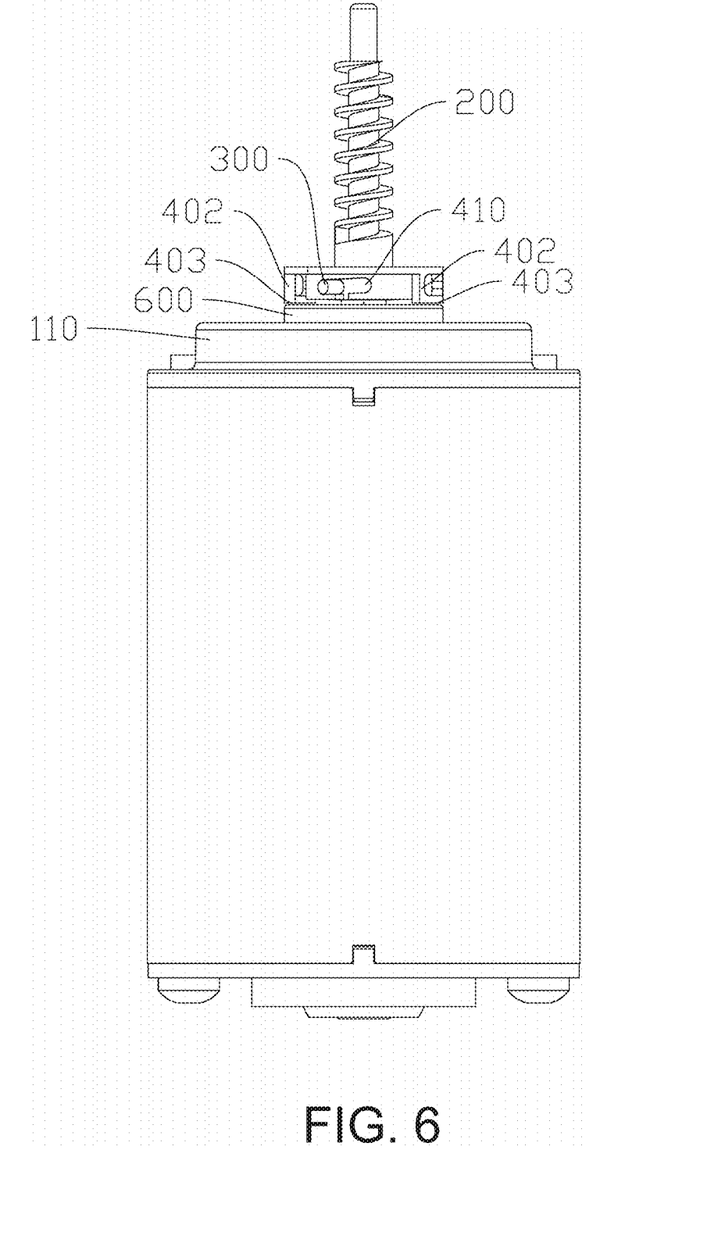
FIG. 6 is a state diagram of the friction cap being detached from the housing and relieving self-locking according to a first embodiment of the disclosure.
Figure 7:
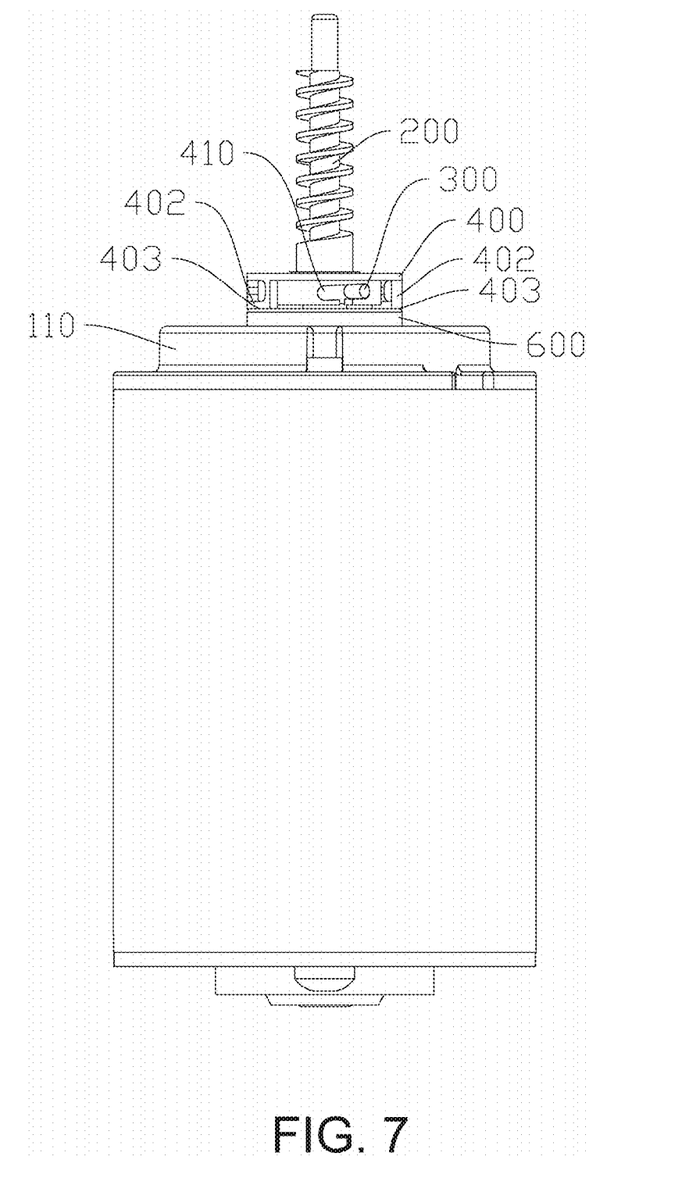
FIG. 7 is a state diagram of the friction cap contact the housing and enabling self-locking according to a first embodiment of the disclosure.

In this embodiment, the rotating motor shaft 200 brings the pin rod 300 to rotate synchronously. Since the pin rod 300 is in sliding-fit with the arc-shaped groove 410 on the friction cap 400, the pin rod 300 may slide from one end of the arc-shaped groove 410 to the other end thereof. A certain distance existent between the two ends of the arc-shaped groove 410 in the axial direction of the motor shaft 200 allows for the pin rod 300 to drive the friction cap 400 to move along the axial direction of the motor shaft 200. When the friction cap 400 is driven to move axially to contact the front bearing 600 to generate friction (As shown in FIG. 7), the friction force between the friction cap 400 and the front bearing prevents continued rotation of the motor shaft 200 to enable self-locking. When the friction cap 400 moves axially till being detached from the housing 100 (As shown in FIG. 6), self-locking of the motor shaft 200 is relieved. In the case that the rotating self-locking actuator is applied to electrical furniture, the friction cap 400 is driven by the pin rod 300 to move axially to contact the housing 100 during descending of a furniture part, enabling continuous friction self-locking; at this point, the torque applied on the motor shaft 200 is greater than the self-locking force, which may ensure descending of the furniture part. When the actuator is deactivated, the self-locking force enables braking of the motor shaft 200 to prevent further descending of the furniture part, whereby the furniture part may stop at the predetermined height position, enhancing user experience.

Specifically, in this embodiment, a bushing 500 is sleeved over the motor shaft 200, the bushing 500 rotating synchronously with the motor shaft 200. The bushing 500 and the motor shaft 200 are interference-fitted or securely welded; the pin rod 300 is securely welded on the bushing 500, or the pin rod 300 and the bushing 500 are one-piece formed. This design eliminates creation of holes on the motor shaft 200, whereby the strength of the motor shaft 200 is ensured; in addition, by varying the mounting position of the bushing 500 on the motor shaft 200, impacts from machining errors may be mitigated.

In this embodiment, to facilitate the pin rod 300's insertion into the arc-shaped groove 410 to realize sliding-fit with the arc-shaped groove 410, a mounting hole 420 communicating with the arc-shaped groove 410 is provided on the friction cap 400, The mounting hole 420 axially communicates the outside with the arc-shaped groove 410. The aperture of the mounting hole 420 is greater than the outer diameter of the pin rod 300, and the mounting hole 420 is disposed proximal to the middle section of the arc-shaped groove 410; therefore, the bushing 500 fixed with the pin rod 300 may be first fixed on the motor shaft 200, then the friction cap 400 is sleeved over the motor shaft 200, followed by inserting the pin rod 300 into the arc-shaped groove 410 via the mounting hole 420. By turning the friction cap 400, the friction cap 400 and the housing 100 are kept in a detached state. In addition, since the mounting hole 420 is disposed proximal to the middle section of the arc-shaped groove 410, disengagement of the pin rod 300 from the arc-shaped groove 410 may be effectively prevented when the friction cap 400 and the housing 100 are kept in a contacting or detached state.

In addition, to reduce wear to the front bearing 600, the friction cap 400 in this embodiment comprises a cap body 401, and support blocks 402 circumferentially disposed at intervals at the outer peripheral side of the cap body 401. In this embodiment, two support blocks 402 are provided and symmetrically distributed; the arc-shaped groove 410 is provided on the cap body 401; each support block 402 has a friction surface 403 for contact with the outer ring of the front bearing 600. Since the friction surface 403 is relatively distant from the motor shaft 200, the arm of the friction force is effectively increased; with a constant self-locking force, the area of the friction surface 403 may be reduced, and then the contact area between the friction cap 400 and the housing 100 may be reduced, whereby wear to the front end cover is reduced.

Most preferably, the support blocks 402 in this embodiment are U-shaped elastic blocks. Friction self-locking is enabled by contacting between bottom edges of the U-shaped elastic blocks and the front bearing 600, This design allows for elastic contact between the bottom edges of the support blocks 402 and the housing 100. Compared with rigid contact, the wear to the front bearing 600 is reduced; besides, under the action of elastic restoring force, the bottom edges of the support blocks 402, even worn to a certain extent, may be deformed outward to realize contact friction with the front bearing 600, whereby the service life of the friction cap 400 is prolonged.

In this embodiment, to facilitate steady axial movement of the friction cap 400 and avoid occurrence of dead lock when the friction cap 400 tips during axial movement, two arc-shaped grooves 410 are symmetrically distributed on the sidewall of the friction cap 400; and two pin rods 300, which are respectively in sliding-fit with the two arc-shaped grooves 410, are provided on the bushing 500. The arc-shaped groove 410 has a central angle $\alpha$ ranging from 30° to 150°, A central angle $\alpha$ less than 30° causes difficulty in machining the arc-shaped groove 410, while a central angle $\alpha$ greater than 150° causes difficulty in arranging the two arc-shaped grooves 410 and reduces structural strength of the friction cap 400. Therefore, in this embodiment, the central angle $\alpha$ is preferably 90°. This design not only facilitates machining of individual arc-shaped grooves 410 but also facilitates arrangement of the two arc-shaped grooves 410. Of course, optionally, the central angle $\alpha$ may also be, but is not limited to, 30°, 50°, 70°, 100°, 120°, and 150° in alternative embodiments.

In addition, this embodiment further limits the axial distance H between the two ends of the arc-shaped groove along the axial direction of the motor shaft 200, where 0<H<0.5 mm; an H greater than 0.5 mm easily causes dead lock when the pin rod 300 slides in the arc-shaped groove 410. Therefore, in this embodiment, H is preferably 0.2 mm. This design facilitates smooth, reciprocal sliding of the pin rod 300 in the arc-shaped groove 410, thereby avoiding dead lock of the pin rod 300 in the case of an overly large axial distance H. Of course, optionally, H may also be, but is not limited to, 0.1 mm, 0.3 mm, 0.4 mm, and 0.5 mm.

It is understood that in alternative embodiments of the disclosure, the motor shaft has a mounting section with a cross section of a non-round shape; the bushing is provided with a mounting hole adapted to the mounting section; and the mounting hole and the mounting section are interference-fitted. This design may also realize synchronous rotation between the bushing and the motor shaft.

It is understood that in alternative embodiments of the disclosure, a through-hole radially running is provided on the motor shaft, the pin rod being insertion-fitted with the through-hole. This design may also enable synchronous rotation between the pin rod and the motor shaft.

It is understood that in alternative embodiments of the disclosure, the friction cap moves axially to contact the front end cover, thereby enabling friction self-locking or detachment.

It is understood that in alternative embodiments of the disclosure, in order to enhance the braking effect to the motor shaft, both ends of the motor shaft may be configured to extend out of the motor housing, and the self-locking device is provided at each of the two ends of the motor shaft.

Second Embodiment

Figure 8:
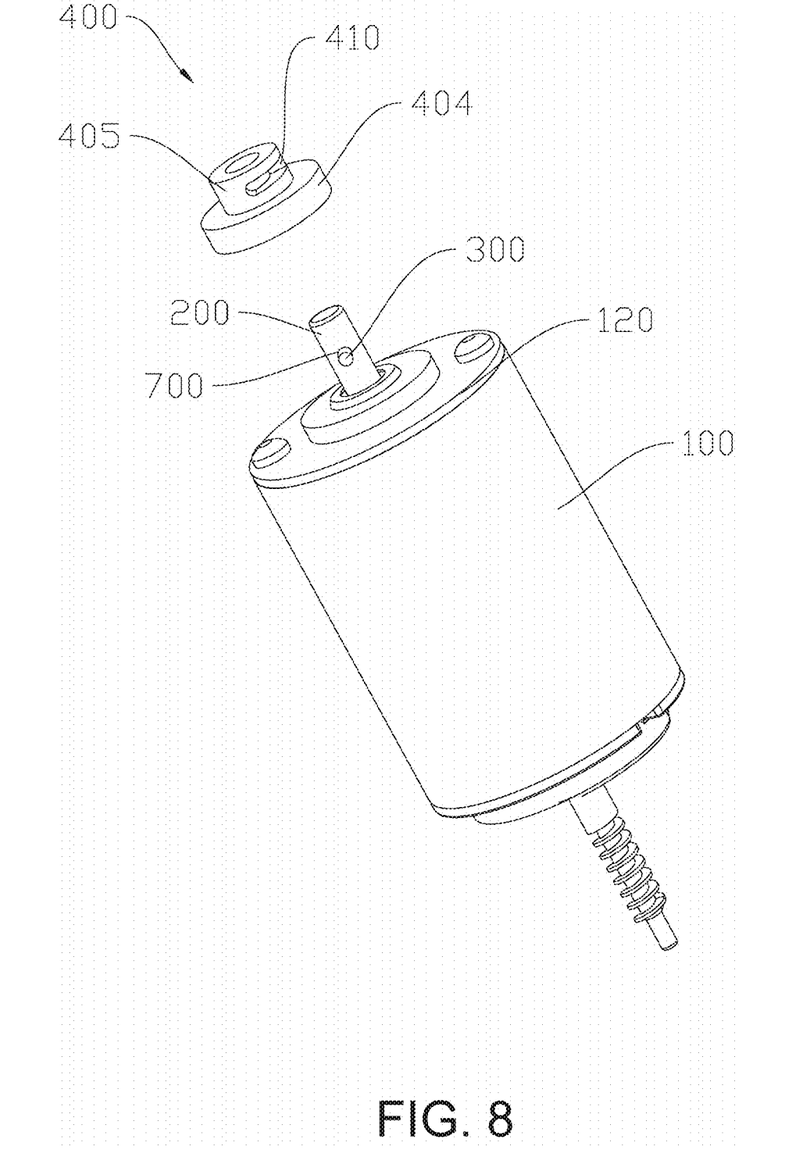
FIG. 8 is a local exploded view of an actuator according to a second embodiment of the disclosure.
Figure 9:
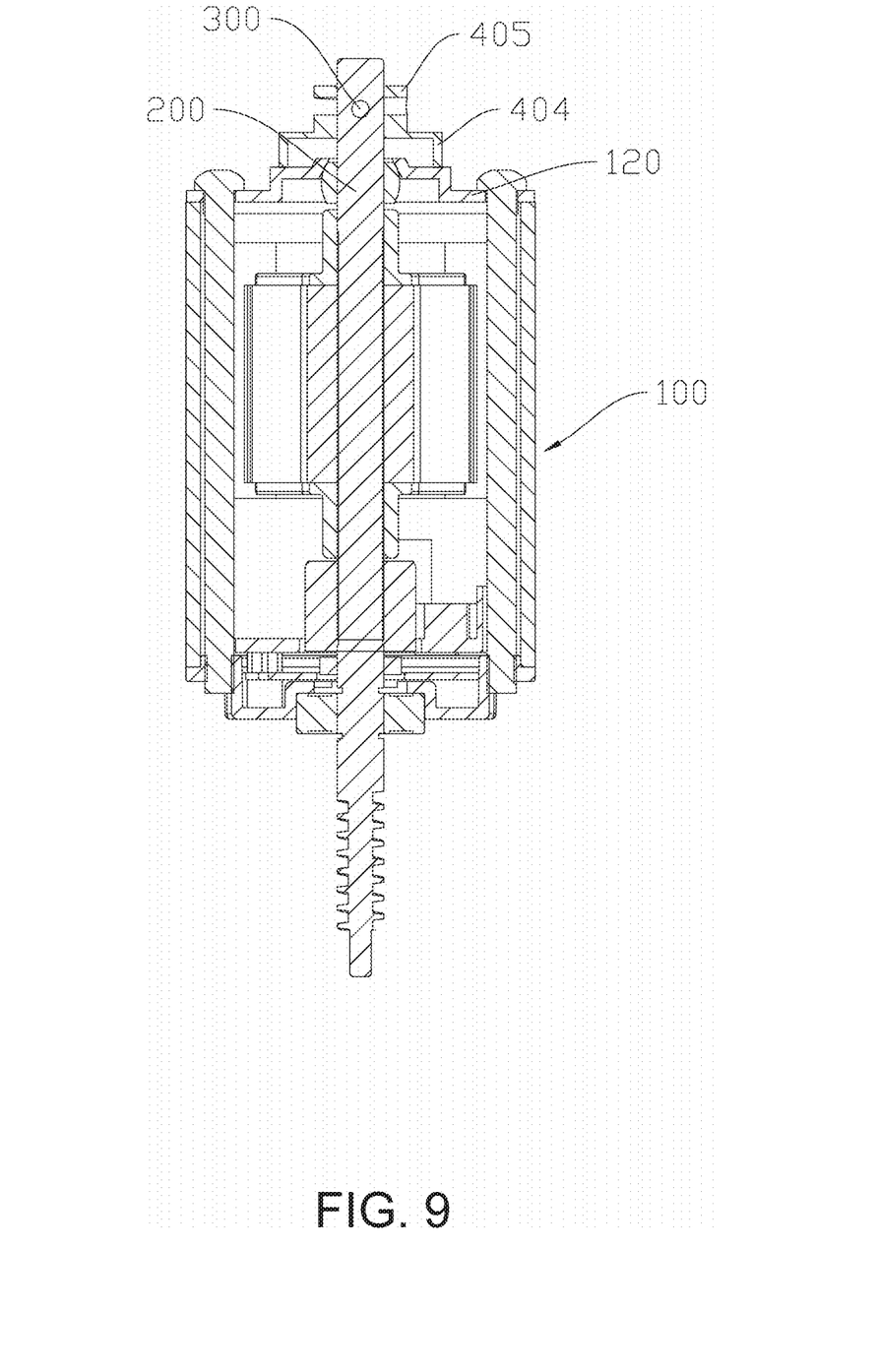
FIG. 9 is a sectional view of the actuator according to the second embodiment of the disclosure.

As illustrated in FIGS. 8 and 9, this embodiment differs from the first embodiment in that the housing 100 further comprises a rear end cover 120, the rear end of the motor shaft running through the rear end cover 120 to be exposed outside the motor housing; a through-hole 700 running radially is provided at the rear end of the motor shaft; the pin rod 300 passes through the through-hole 700 to be insertion-fitted with the through-hole 700; two arc-shaped grooves 410 extending helically about an axial direction of the motor shaft 200 are provided symmetrically on the side wall of the friction cap 400, two ends of the pin rod 300 being sliding-fitted with the two arc-shaped grooves 410, respectively; the friction cap 400 comprises a large cap 404 and a small cap 405 which are axially connected; the arc-shaped grooves 410 are provided on the side wall of the small cap 405; the motor shaft 200 brings the pin rod 300 to rotate such that the friction cap 400 is driven by the pin rod 300 to move axially; axial movement of the friction cap 400 brings the bottom wall of the large cap 404 to contact the rear end cover 120 to enable friction self-locking or detachment. This design simplifies the structure of the friction cap and facilitates machining of the friction cap. Upon assembly, the friction cap 400 is first sleeved over the motor shaft 200, and then the pin rod 300 is inserted through the arc-shaped grooves 410 and the through-hole on the motor shaft.

It is understood that in alternative embodiments of the disclosure, the housing further comprises a rear bearing fixed on the rear end cover; the motor shaft brings the pin rod to rotate such that the friction cap is driven by the pin rod to move axially; the fiction cap moves axially to contact the rear bearing, whereby friction self-locking or detachment is enabled.

Third Embodiment

Figure 10:
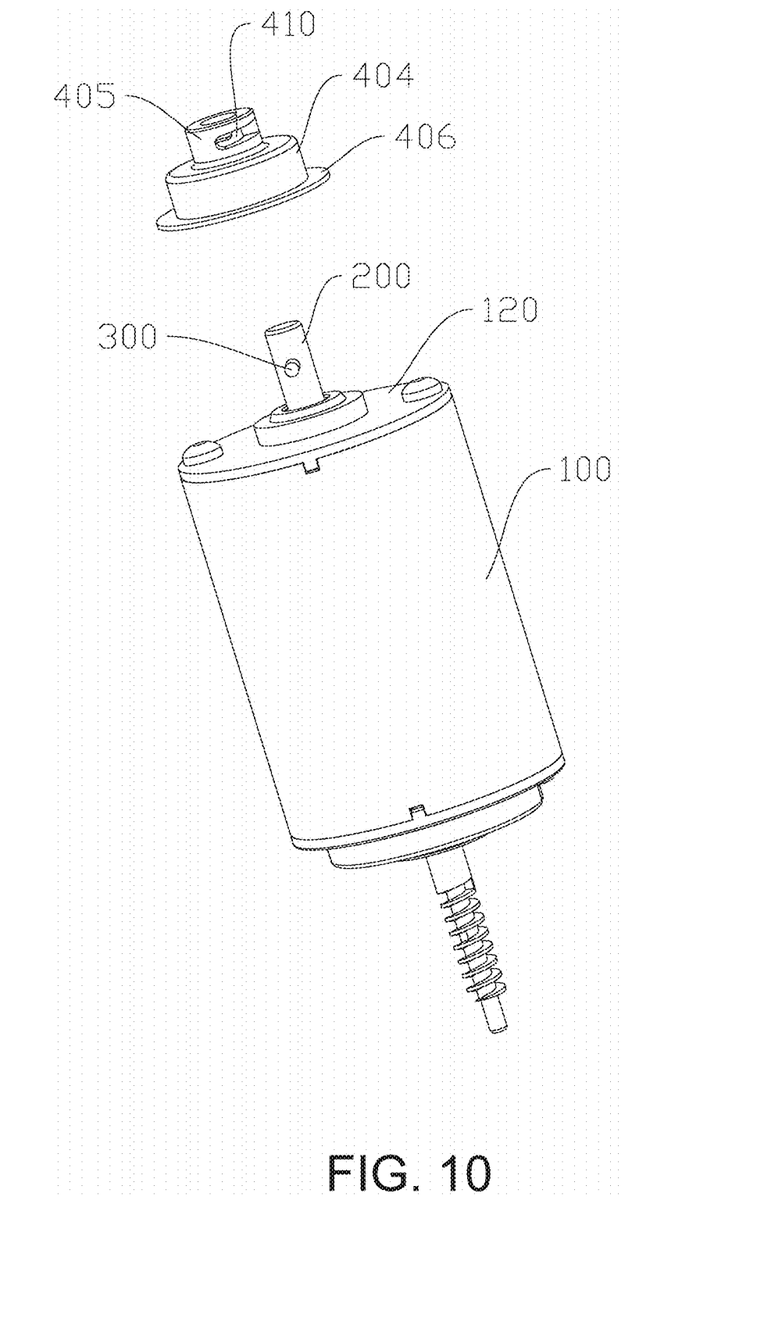
FIG. 10 is a local exploded view of an actuator according to a third embodiment of the disclosure.

As illustrated in FIG. 10, this embodiment differs from the second embodiment in that the friction cap 400 further comprises a flange 406 which is disposed on the bottom wall of the large cap 404 and extends radially outward; the friction cap 400 moves axially to allow the bottom wall of the flange 406 to contact the rear end cover 120, whereby friction self-locking or detachment is enabled: this design may increase the contact area between the friction cap 400 and the rear end cover 120, further enhancing self-locking force.

It is understood that in alternative embodiments of the disclosure, the housing further comprises a rear bearing fixed on the rear end cover; the motor shaft brings the pin rod to rotate such that the friction cap is driven by the pin rod to move axially; the friction cap moves axially to contact the rear bearing, whereby friction self-locking or detachment is enabled.

Fourth Embodiment

Figure 11:
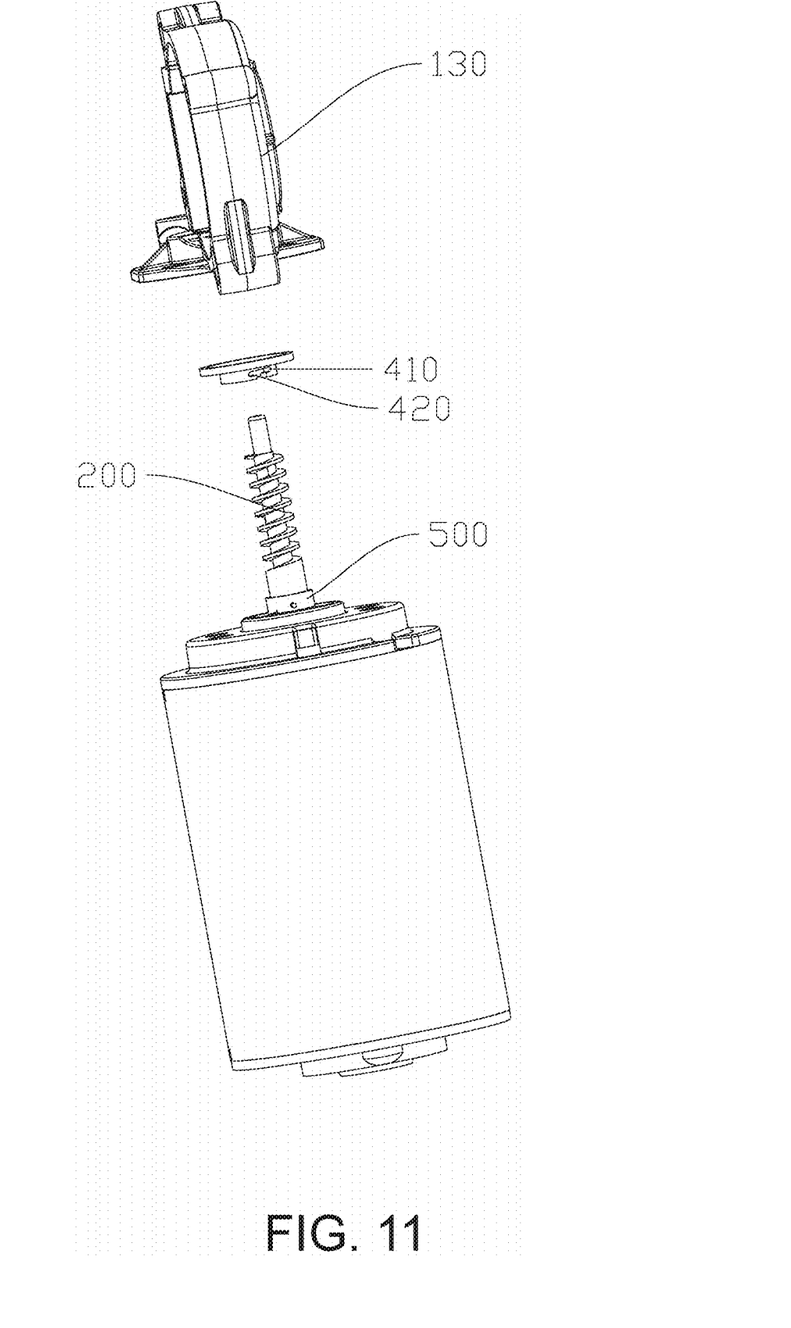
FIG. 11 is a first local exploded view of an actuator according to a fourth embodiment of the disclosure.
Figure 12:
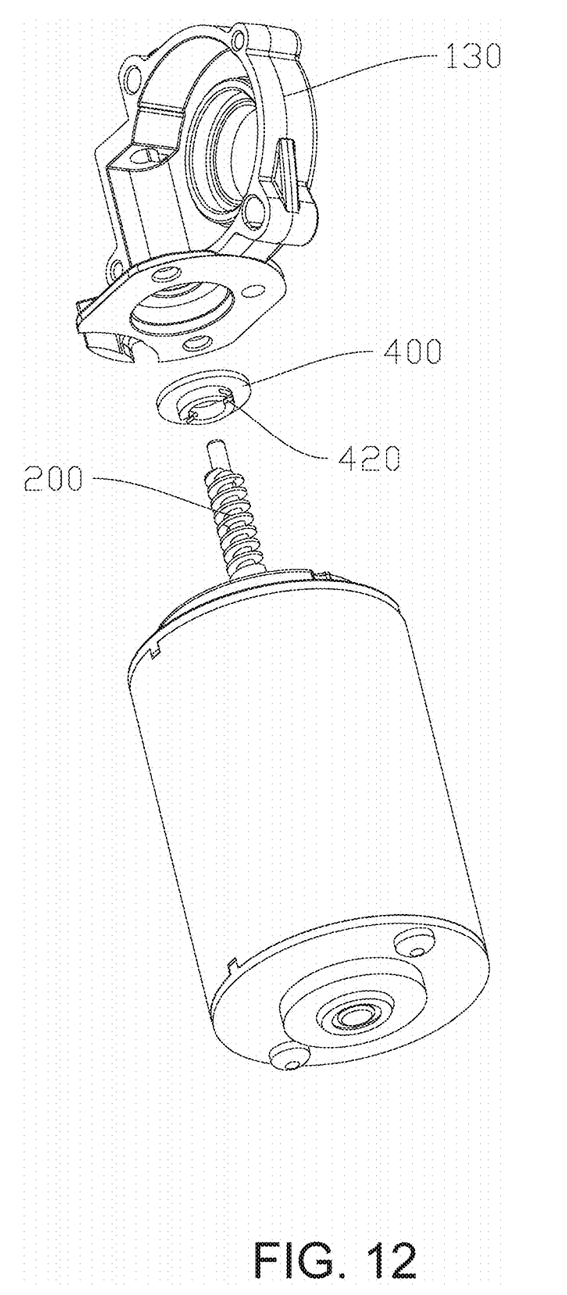
FIG. 12 is a second local exploded view of the actuator according to the fourth embodiment of the disclosure.

As illustrated in FIGS. 11 and 12, this embodiment differs from the first embodiment in that the actuator comprises an electric motor and a gearbox; the housing 100 comprises a motor housing and a gearbox housing 130; one end of the motor shaft 200 extends out of the motor shaft; a front friction surface in contact with the gearbox housing 130 is provided at one end of the friction cap 400 distal from the mounting hole 420; the friction cap 400 moves axially such that the front friction surface contacts the gearbox housing 130, whereby self-locking or detachment is enabled.

It is understood that in alternative embodiments of the disclosure, the structure of the friction cap and the fixing manner between the pin rod and the motor shaft may refer to the technical solutions described in the second or third embodiment.

It is noted that in alternative embodiments of the disclosure, the structure of the friction cap and the fixing manner between the pin rod and the motor shaft in the first embodiment may adopt the technical solution described in the second or third embodiment; after the self-locking device is provided at the rear end of the motor shaft, the structure of the friction cap and the fixing manner between the pin rod and the motor shaft may adopt the technical solution described in the first embodiment.

What have been described above are only embodiments of the present disclosure; however, the protection scope of the present disclosure is not limited thereto. A person skilled in the art should understand that the disclosure includes, but is not limited to, the contents described in the drawings and the embodiments. Any modifications without departing from the functions and structural principles of the disclosure will be included within the scope of the claims.

We claim:

1. A rotating self-locking actuator, comprising:
a housing,
a self-locking device, and
a motor shaft at least one end of which extends out of the housing, wherein the self-locking device comprises;
a pin rod;
a friction cap which is disposed outside the housing and sleeved over the motor shaft; and
an arc-shaped groove extending helically about an axial direction of the motor shaft, the arc-shaped groove being provided on a side wall of the friction cap;
wherein:
the pin rod rotates synchronously with the motor shaft and is sliding-fitted with the arc-shaped groove; and
the motor shaft causes the pin rod to rotate such that the friction cap is driven by the pin rod to move axially to contact the housing, thereby friction self-locking is enabled, and the friction cap is driven by the pin to move axially to detach from the housing, thereby the friction self-locking is released.

2. The self-locking actuator of claim 1, wherein a through-hole running radially is provided on the motor shaft, the pin rod being insertion-fitted with the through-hole.

3. The self-locking actuator of claim 1, wherein a bushing is sleeved over the motor shaft, the bushing rotating synchronously with the motor shaft, the pin rod being fixed on the bushing.

4. The self-locking actuator of claim 1, wherein a mounting hole is provided on the friction cap, the mounting hole being in communication with the arc-shaped groove, the pin rod being inserted in the arc-shaped groove via the mounting hole.

5. The self-locking actuator of claim 1, wherein the friction cap comprises a cap body where the arc-shaped groove is provided, and support blocks circumferentially provided at intervals at an outer peripheral side of the cap body, the support blocks each having a friction surface for contact with the housing.

6. The self-locking actuator of claim 5, wherein the support blocks are U-shaped elastic blocks, bottom edges of the U-shaped elastic blocks contacting the housing to enable friction self-locking.

7. The self-locking actuator of claim 1, wherein the arc-shaped groove has a central angle α ranging from 30° to 150°.

8. The self-locking actuator of claim 1, wherein an axial distance H between two ends of the arc-shaped groove along the axial direction of the motor shaft is greater than 0 mm and less than 0.5 mm.

9. The self-locking actuator of claim 1, wherein two arc-shaped grooves are symmetrically distributed on the side wall of the friction cap.

10. The self-locking actuator of claim 1, wherein the actuator comprises an electric motor, the housing comprising a motor housing, at least one end of the motor shaft extends out of the motor housing, and the friction cap moves axially to contact the motor housing, whereby friction self-locking or detachment is enabled; or, the actuator comprises an electric motor and a gearbox, the housing comprises a motor housing and a gearbox housing, at least one end of the motor shaft extends out of the motor housing, and the friction cap moves axially to contact the gearbox housing, whereby friction self-locking or detachment is enabled.

11. The self-locking actuator of claim 2, wherein the arc-shaped groove has a central angle α ranging from 30° to 150°.

12. The self-locking actuator of claim 3, wherein the arc-shaped groove has a central angle α ranging from 30° to 150°.

13. The self-locking actuator of claim 4, wherein the arc-shaped groove has a central angle α ranging from 30° to 150°.

14. The self-locking actuator of claim 5, wherein the arc-shaped groove has a central angle α ranging from 30° to 150°.

15. The self-locking actuator of claim 6, wherein the arc-shaped groove has a central angle α ranging from 30° to 150°.

16. The self-locking actuator of claim 1, wherein the housing comprises (i) a front end cover and (ii) a front bearing disposed on the front end cover.

* * * * *